Patented Nov. 9, 1943

2,333,730

UNITED STATES PATENT OFFICE 2,333,730

PHENOL RUBBER POLYBUTENE COMPOSITION AND ARTICLE MADE THEREFROM

James A. Mitchell, Kenmore, N. Y., assignor to E. I. du Pont de Nemours & Company, Wilmington, Del., a corporation of Delaware No Drawing. Application June 21, 1941, Serial No. 399,240

9 Claims. (Cl. 260—4)

This invention relates to moisture-resistant wrapping material, especially moistureproofed, transparent, non-fibrous sheet. More particularly it appertains to nontacky, heat-sealable, age-resistant, light- and heat-stable, self-anchoring, moistureproofing coatings on films of regenerated cellulose and the like.

One of the newer sheet wrapping materials consists of a thin, cellulosic base sheet having a moistureproofing coating. The manufacture of typical base sheet (film, foil, pellicle, skin, tissue, web) is described in U. S. A. Patents Nos. 1,548,864 (Brandenberger) and 2,123,883 (Ellsworth). Representative coating compositions, and the application thereof, are set out in U. S. A. Patents Nos. 1,737,187 (Charch and Prindle), 1,826,697-8 (Charch and Craigue), 2,042,589 (Charch and Hershberger), 2,147,180 (Ubben), 2,159,151 (Hershberger), 2,169,366 (Meigs) and 2,201,747 (Staudt).

The coating is usually a continuous, unbroken layer comprising essentially moistureproofing material (material which does not dissolve more than an infinitesimal amount of, if any, water), for example, a waxy (wax-like) substance such as paraffin wax, a cementing (binding, film-forming) material therefor, for example, cellulose nitrate. Generally the base film contains softening material, for example, glycerol, and the coating contains plasticizing material, for example, dibutyl phthalate, to promote flexibility.

To overcome any haziness which might result from some proportions and combinations of other components of the coating, transparentizing (blending, homogenizing) material, for example, resins and gums such as dammar and ester gum, is ordinarily included.

In spite of the many desirable properties of this kind of wrapping material, it has certain characteristics which limit its usefulness. One difficulty is encountered in sealing such material when it is employed as a wrapper. One of the commonest and simplest methods for sealing packages (so that the contents are completely enclosed) is by means of heat and pressure. Moistureproofed, transparent, regenerated cellulose film possesses to a certain degree the characteristic of being sealable by this method, but it does not possess this property to an extent which is completely satisfactory. Extensive research has been, and is being, carried out with the object in view of improving this type of material, particularly with respect to the characteristics just mentioned.

When rubber is worked on a rubber mill (or an equivalent, such as a Banbury mixer) with about one-tenth of its weight of beta-naphthol in the presence of a small amount of a special catalyst, for example, di-hydroxy-fluoro-boric acid or sulfuric acid, for about 15 minutes at 100° C., a material is obtained which is quite unlike rubber and the heretofore known rubber derivatives (including products designated as cyclized rubber and rubber isomers). The new material sinks when placed in water, will not adhere to rubber, is more soluble in hydrocarbon solvents than rubber isomers, and when mixed with rubber on a mill and the mixture made into a thin cement, layers off. The material seems to be an alkylated phenol in which the rubber is the alkylating agent (the phenol molecule apparently having chemically combined with the rubber molecule, probably at what was an unsaturated carbon atom in ordinary rubber).

It has previously been proposed that this material, for convenience referred to as "Phenol Rubber Reaction Product 2,158,530," or more simply, "phenol rubber product," be employed in moistureproofing coating compositions. The suggestion has not been widely adopted for the reason that this material seems to suffer some deleterious molecular change with age. The fact that it discolors, particularly when subjected to sunlight and/or heat, has greatly retarded its use, as has the fact that adhesive bonds containing this substance, even though they be initially very good, weaken rapidly.

It was an object of this invention to provide improved coating compositions. Other objects were to produce improved moistureproofing coating compositions, improved moistureproofing coatings and improved moistureproof sheet wrapping material. Further objects were to produce improved moistureproofed, non-fibrous pellicles, to produce satisfactory coating compositions comprising phenol-rubber product material, to produce coating compositions which would adhere firmly to a flexible base sheet even when subjected to moisture and water for long periods of time, to produce coating compositions which will give adhesive bonds of great strength upon the application of heat and pressure, to produce coating compositions which will remain stable when exposed to high temperatures, light and the like, for long periods of time, and to produce a composition which will, upon the application of heat and pressure, give adhesive bonds of great strength for laminating thin, flexible, non-fibrous sheet material such as regenerated cellulose and the like. A general advance in the art, and other objects which will appear hereinafter, are also contemplated.

Surprisingly, it has now been found that compositions prepared from phenol-rubber product material and polymerized isobutylene, for example, moistureproofing coatings, have excellent heat sealability, give adhesive bonds which are initially very good and remain so for long periods of time, and are stable and transparent after long exposure to light, high temperatures, etc.

How the foregoing objects and related ends are accomplished will be apparent from the following exposition, in which are disclosed the principle and divers embodiments of the invention, including the best mode contemplated for carrying out the same. Parts are given by weight unless otherwise specified.

Example I

Treat rubber with 17% of its weight of beta-naphthol on a rubber mill in the manner described in U. S. A. Patent No. 1,158,530 (Williams). Extract the unreacted beta-naphthol from the reaction product with ethanol, and with the purified material prepare a moistureproofing lacquer consisting of:

|  | Parts |
|---|---|
| Beta-naphthol rubber product | 24 |
| Paraffin wax (M. P. 60° C.) | 3 |
| Polybutene (molecular weight approximately 30,000) (Vistanex #6) | 3 |
| Toluene | 220 |

Coat a sheet of regenerated cellulose approximately 0.00088 of an inch thick in the conventional manner by passing it through the moistureproofing lacquer, removing the excess solution from the surface by means of doctor knives, and drying in a drier through which air is circulating and where, after a rapid rise in temperature, the volatile solvent is removed at a temperature approximately equal to the melting point of the wax. Exceptionally good moistureproofness (permeability value 20), adhesion and heat sealability (heat seal value 300) and anchorage characteristics, will be obtained.

Example II

Coat a sheet of regenerated cellulose approximately 0.00088 of an inch thick with a moistureproofing coating composition in the usual manner, by passing it through a bath consisting of:

|  | Parts |
|---|---|
| Beta-naphthol rubber product (purified) | 12.3 |
| Paraffin wax (M. P. 60° C.) | 1.2 |
| Polybutene (molecular weight approximately 30,000) (Vistanex #6 grade) | 1.5 |
| Toluene | 110.0 | and removing the excess solution from the surface by means of doctor knives. Introduce the coated sheet into a drier through which air is circulating and where, after a rapid rise in temperature, the coating will dry at a temperature approximately equal to the melting point of the wax. The resulting product will be moistureproof, have a permeability value of 2 and a heat seal value of 900.

Example III

Coat one side only of regenerated cellulose sheet 0.00088 of an inch in thickness with a composition consisting of:

|  | Parts |
|---|---|
| Beta-naphthol rubber product (purified) | 15.62 |
| Paraffin wax (M. P. 60° C.) | 18.75 |
| Polybutene (M. W. approx. 30,000) (Vistanex #6) | 28.12 |
| Toluene | 188.00 | in the manner described in Example I. After drying, and while the product is still hot, press the coated side of the sheet against another sheet of regenerated cellulose to bond the two together. After cooling, the two sheets of regenerated cellulose will be firmly adhered together, and the resulting unitary product will be moistureproof. It will have a permeability value of 200 and be extremely resistant to the action of water and atmospheres of high humidity.

Example IV

Coat one side only of a thin cellulose acetate sheet with a composition consisting of:

|  | Parts |
|---|---|
| Beta-naphthol rubber product (purified) | 9.37 |
| Paraffin wax (M. P. 60° C.) | 25.00 |
| Polybutene (M. W. approx. 7,000) | 28.13 |
| Toluene | 188.00 | doctor the coated sheet, and remove the solvent by the method of Example I. While still hot apply a sheet of paper to the coated surface and press the two sheet materials into firm engagement. The resulting laminated product will resist the deleterious action of water vapor for long periods of time, and the component laminae will remain firmly adhered together.

Example V

Coat both sides of a sheet of regenerated cellulose with a moistureproofing lacquer having the formulation:

|  | Parts |
|---|---|
| Beta-naphthol rubber product (purified) | 22.5 |
| Paraffin wax (M. P. 60° C.) | 3.0 |
| Polybutene (M. W. approx. 7,000) | 4.5 |
| Toluene | 220.0 | by the method described in Example I. The resulting product will be transparent, have a permeability value of 5, and have a heat seal value of 800. The coating will be firmly adherent after exposure to water for a period of one day.

Example VI

Coat both sides of a sheet or regenerated cellulose with a solution of:

|  | Parts |
|---|---|
| Beta-naphthol rubber product (purified) | 24 |
| Paraffin wax (M. P. 60° C.) | 3 |
| Polybutene (M. W. approx. 1,000) (Vistac) | 3 |
| Toluene | 220 | in the manner set out in Example I. The resulting product will show superior adhesion of the coating, moistureproofness, anchorage, and heat sealing.

Example VII

Coat both sides of a regenerated cellulose film in the manner described in Example I, with a solution consisting of:

|  | Parts |
|---|---|
| Beta-naphthol rubber product (purified) | 24.6 |
| Paraffin wax (M. P. 60° C.) | 3.0 |
| Polybutene (M. W. approx. 1,000) (Vistac) | 2.4 |
| Toluene | 220.0 |

The resulting coated film will exhibit considerably less degradation in moistureproofness, heat sealing, adhesion and anchorage when exposed to ultra-violet light or heated in an atmosphere containing oxygen than similar appearing film prepared in an identical manner but substituting a heavy hydrocarbon oil, such as mineral oil or petrolatum, for the polybutene. The final product will also differ in the same manner from material produced in the same manner but omitting the polybutene.

*Example VIII*

Coat a regenerated cellulose film with a moistureproofing solution comprising:

| | Parts |
|---|---|
| Beta-naphthol rubber product (purified) | 24 |
| Paraffin wax (M. P. 60° C.) | 3 |
| Polybutene (M. W. approx. 1,000) (Vistac) | 3 |
| Toluene | 220 | by the method of Example I. Coat bleached kraft paper with the same composition in the same manner.

*Example IX*

Coat one side only of a sheet of regenerated cellulose with a composition consisting of:

| | Parts |
|---|---|
| Beta-naphthol rubber product (purified) | 40 |
| Polybutene (M. W. approx. 7,000) | 6 | in the manner described in Example IV. Bond a sheet of cellulose acetate to the resulting product by the application of heat and pressure. Bond a sheet of paper to the coated regenerated cellulose by the application of heat and pressure. Good adhesive bonds will result.

*Example X*

Coat both sides of a sheet of regenerated cellulose, using the procedure of Example I and a moistureproofing lacquer comprising essentially:

| | Parts |
|---|---|
| Beta-naphthol rubber product (purified) | 25 |
| Paraffin wax (M. P. 60° C.) | 3 |
| Polybutene (M. W. approx. 200,000) | 1.5 |
| Xylene | 300.0 |

The resulting product will be highly transparent and exhibit a permeability value of 10 and a heat seal value of 500.

*Example XI*

Coat a dry cast cellulose acetate film approximately .001 of an inch in thickness in the manner described in Example I, with a composition comprising essentially:

| | Parts |
|---|---|
| Beta-naphthol rubber product (purified) | 11.7 |
| Paraffin wax (M. P. 60° C.) | 1.8 |
| Polybutene (M. W. approx. 8,000) (Visco resin) | 1.5 |
| Benzene | 110.0 |

After removal of the volatile solvent the coating will firmly adhere to the surface of the sheet, be moistureproof, have a permeability value of 5 and a heat sealing value of 460.

The preparation of the phenol-rubber product is described in detail in U. S. A. Patent 2,158,530 (Williams) and reference is made thereto for details. For convenience it may be pointed out that the amount of the phenolic material (phenol, naphthol, cresol, dihydroxy-diphenyl, etc.), may vary widely, the ordinary limits being 5% to 55% (based on the rubber). The products prepared by milling 5 to 20 parts of beta-naphthol with 100 parts of rubber in the presence of 4 parts of sulfuric acid as a catalyst, are the preferred materials. One or more individual phenol rubber substances may make up the proportions used in the new compositions.

The crude product (containing excess phenolic material) may be used as produced, if desired, but the best results in the coating composition field have been obtained when the excess of the phenolic material was removed. This can be accomplished by ordinary extraction procedures utilizing as solvents such materials as alcohols, for example, ethanol and butanol. If desired, the reaction product may be purified by dissolving in toluene and precipitating the phenol rubber product with ethyl alcohol (which retains the unreacted phenolic material in solution).

Various phenols in addition to the simple hydroxy benzene and beta-naphthol of the examples, for instance, chloro-phenol, cresol, and di-hydroxy-di-phenyl, may be employed in the manufacture of the phenol rubber product. The phenolic substances may be used singly or in a mixture. Catalysts other than the sulfuric acid and di-hydroxy-fluoro-boric acid, for example, organic sulfonic acids, hydroxy-fluoro-boric acid, and boron-tri-fluoride, may be employed.

The phenol rubber products of this invention, which may be designated by a variety of names other than those already mentioned, for example, "rubber alkylated phenol," "phenol modified rubber," "rubber substituted phenol" and "phenol rubber condensation product," are resinous, transparent, thermoplastic, benzene-soluble derivatives of rubber obtained by reacting rubber with a monohydric phenol which contains no substituents other than halogen and hydrocarbon radicals, and which may be hydrogenated, as indicated in U. S. A. Patent 2,158,530, which is resistant to acids and alkalies, which does not adhere to rubber, which has an impact strength similar to phenol aldehyde resins, and which imparts a hardness to rubber (when compounded therewith) like glue and montan wax.

The various terms used to describe the product in this application are intended to apply only to the type of material obtained according to the procedure (and its equivalents) set out in U. S. A. Patent 2,158,530. These expressions are not to be construed broadly enough to cover isomers or like derivatives of rubber which might be obtained by using phenol or phenol sulfonic acid in a simple catalytic capacity.

The polymers, both high (40,000–300,000) and low molecular weight, of iso-olefins, such as isobutylene, used in this invention, are well known materials (J. I. E. C. XXXII 299,731). Several varieties are available commercially under proprietary names, for example, Vistac (approximate average 500–1500), Visco resin (approximate average 5,000–10.000) and Vistanex #6 (approximate average 20,000–40,000), and other molecular weight material can easily be produced. Polymers having a molecular weight within the range 300 to 300,000 have been found useful. Products in the intermediate range of 500 to 100,000 are preferred. In general, the products are prepared by polymerizing isobutylene (or related olefin) at low temperatures with a catalyst such as boron trifluoride, phosphorous trifluoride, aluminum chloride and sulfuric acid. For specific details of the preparation reference is made to U. S. A. Patents Nos. 2,130,507 and 2,051,840.

As the moistureproofing agent, any wax (used generically to include waxy substances like paraffin wax, as well as true waxes which are monohydric alcohol esters of higher fatty acids) or mixture of waxes, may be employed. Ordinarily paraffin wax melting above 50° C., or better, that melting at 60° C. (and above), is preferred.

The compositions of this invention are intended primarily for coating transparent, smooth, substantially non-porous, non-fibrous, water-sensitive sheet which may be obtained by coagulation or precipitation and/or regeneration from aqueous (or aqueous alkaline, for example, alkali metal hydroxide and the like) dispersions (or solutions). The results obtained with regenerated cellulose (from viscose, cuprammonium, and like sources), polyvinyl alcohol, low (lowly) substituted (less than one mol per glucose unit) cellulose ethers (U. S. A. Patent No. 2,123,880 to Ellsworth), such as glycol cellulose, cellulose glycolic acid and alkyl (for example, methyl and ethyl) cellulose, are especially satisfactory. They may also be advantageously employed with organic solvent soluble products, such as cellulose ethers (for example, ethyl cellulose), cellulose esters (for example, cellulose acetate), polyvinyl acetals, and the like. Lowly esterified cellulose, albuminous material (gelatin, casein, etc.), paper, modified paper, and the like, may also be employed in connection with the new compositions. The new products may be used to coat fabrics, to prepare molding materials, to act as cementing (binding) agents in protective coatings for wood, metal, etc., as adhesives, and numerous other purposes.

The properties of the phenol-rubber product-isobutylene polymer compositions may be enhanced and modified in known ways by the incorporation of minor proportions of other materials. Details of the conventional modifying practices such as dyeing, pigmenting, plasticizing (or softening), transparentizing, and like procedures and materials used therein, are well known and are disclosed in the patent art. Reference is made thereto for specific details. Beneficial results are frequently brought about by incorporating natural and/or synthetic resins.

Organic solvent soluble amino polymers (basic amino nitrogen-containing polymers) of the type disclosed in U. S. A. Patent No. 2,190,776 (Ellingboe and Salzberg) may be added to the composition for further or specialized protection. These materials are also soluble in 2% aqueous acetic acid. Anti-oxidants and other stabilizers may be added for the same purpose.

In preparing the coating compositions, any solvent dissolving the phenol rubber product and the polybutene (hydrocarbon) may be used, although hydrocarbon solvents, particularly aromatics such as toluene or benzene, are preferred. Mixed solvents such as those containing minor proportions of ketones, esters, or alcohols, may be used. These compositions may be applied as melts at high temperatures, in which case no solvent, or only a minor proportion of solvent, need be present.

Ordinary moistureproof sheet wrapping material consists of a regenerated cellulose film 0.00088 of an inch thick, with a moistureproofing coating 0.0005 of an inch thick on each side.

The amount of polybutene material in the new compositions is preferably within the range 0.5% to 50.0% (based on the amount of phenol rubber product), but in special instances it may be desirable to use much more, for example, up to 200% or even more.

Incorporation of wax in the new phenol rubber product-polybutene compositions leads to moisture resistance. Ordinarily 3% to 15% wax, based on the total solids (non-volatiles) is employed to secure moistureproofness in coating compositions. Noticeable improvement is obtainable with even smaller amounts.

By the expression "anchor" or equivalents (anchoring, anchored, etc.) is meant the securing of the surface coating on the base in such a way that the resulting product will withstand the deleterious effects of water (or moisture). Whether a substance is an anchoring agent or not is easily determined, for example, by comparing the time of immersion in water required to loosen a moistureproofing coating containing the substance, with the time required to bring about the same loosening with the coating omitting the substance being tested (but otherwise having the same proportions of ingredients). Compositions of this invention, when tested by immersion in water at 20° C., give a several-fold improvement in the time required to loosen the coating from the water sensitive and non-moistureproof base sheet.

Moistureproofness, moistureproofing and moistureproof materials and expressions are defined in U. S. A. Patent No. 2,147,180 (Ubben). In the interest of brevity the definitions are not repeated here. The terms and expressions related thereto and employed herein are used in accordance with such definitions.

Heat seal bond and heat seal bond strength are defined, and a standard test for their determination is given, in U. S. A. Patent No. 2,147,180 (Ubben). In the interest of brevity the definitions and test description are not repeated here. The terms and expressions related thereto and employed herein are used in accordance with such definitions and description.

The moisture resistant coating compositions of this invention adhere more firmly to the base sheets to which they are applied than heretofore proposed compositions. In particular they adhere very tenaciously for long periods of time when subjected to high humidity, moisture, water, etc. The moistureproof materials give exceptionally good protection. Adhesive bonds formed by the application of heat and pressure are particularly strong and durable, and maintain their effectiveness for long periods of time. In general the phenol rubber products are stabilized by the incorporation of the polybutenes to such an extent that the desirable properties of coatings, adhesive layers, etc., made therefrom are not altered over long periods of time. Especially is this true when they are exposed to light, ultraviolet light and heat.

It is surprising that these desirable results should be so outstanding, because it is well known that heavy hydrocarbon oils do not produce such a result, that is to say, the results of this invention are not obtained if heavy hydrocarbon oils and other materials of a similar nature are substituted for the polybutene material in the various compositions.

It has not been possible to obtain the results of this invention with other stabilizing materials heretofore known in the art and used for the purpose of stabilizing coating compositions comprising phenol rubber products.

As many apparently widely different embodiments of this invention may be made without departing from the spirit and scope thereof, it is to be understood that this invention is not limited to the specific embodiments thereof except as defined in the appended claims.

I claim:

1. A coating composition comprising essentially phenol rubber product, polymer of isobutylene and wax, said phenol rubber product being a reaction product of rubber and at least one phenol containing 1% to 5% of the phenol material chemically combined with the rubber, which is resinous, thermoplastic, benzene soluble, acid resistant and alkali resistant, which does not adhere to rubber, which has an impact strength similar to phenol aldehyde resins, and which imparts a hardness to rubber like glue.

2. An adhesive material comprising beta-naphthol rubber product and high molecular weight polybutene, said beta-naphthol rubber product being a reaction product of rubber and at least one phenol, containing 1% to 5% of the phenol material combined with the rubber, which is resinous, thermoplastic, benzene soluble, acid resistant and alkali resistant, which does not adhere to rubber, which has an impact strength similar to phenol aldehyde resins and which imparts a hardness to rubber like glue.

3. Wrapping material comprising essentially a base sheet having a coating comprising essentially phenol rubber product, high molecular weight polymer of isobutylene and wax, said phenol rubber product being a reaction product of rubber and at least one phenol, containing 1% to 5% of the phenol material chemically combined with the rubber which is resinous, thermoplastic, benzene soluble, acid resistant and alkali resistant, which does not adhere to rubber, which has an impact strength similar to phenol aldehyde resins, and which imparts a hardness to rubber like glue.

4. Moistureproof, transparent sheet wrapping material comprising essentially a regenerated cellulose film having a coating comprising essentially phenol rubber product, polymer of isobutylene and wax, said phenol rubber product being a reaction product of rubber and at least one phenol, containing 1% to 5% of the phenol material chemically combined with the rubber which is resinous, thermoplastic, benzene soluble, acid resistant and alkali resistant, which does not adhere to rubber, which has an impact strength similar to phenol aldehyde resins and which imparts a hardness to rubber like glue.

5. The process of preparing heat sealable wrapping material which comprises coating a nonfibrous sheet with a composition comprising essentially phenol rubber product, polymer of isobutylene and paraffin wax, said phenol rubber product being a reaction product of rubber and at least one phenol, containing 1% to 5% of the phenol material chemically combined with the rubber which is resinous, thermoplastic, benzene soluble, acid resistant and alkali resistant, which does not adhere to rubber, which has an impact strength similar to phenol aldehyde resins and which imparts a hardness to rubber like glue.

6. Sheet wrapping material comprising regenerated cellulosic sheet having a coating comprising essentially:

| | Parts |
|---|---|
| Beta-naphthol rubber product (purified) | 24 |
| Paraffin wax (M. P. 60° C.) | 3 |
| Polybutene (M. W. 1,000) | 3 | said beta-naphthol rubber product being a reaction product of rubber and at least one phenol, containing 1% to 5% of the phenol material chemically combined with the rubber which is resinous, thermoplastic, benzene soluble, acid resistant and alkali resistant, which does not adhere to rubber, which has an impact strength similar to phenol aldehyde resins, and which imparts a hardness to rubber like glue.

7. The process of stabilizing phenol rubber reaction products which comprises incorporating therein a polybutene of molecular weight in the range 300 to 300,000, said phenol rubber reaction product being a reaction product of rubber and at least one phenol, containing 1% to 5% of the phenol material chemically combined with the rubber which is resinous, thermoplastic, benzene soluble, acid resistant and alkali resistant, which does not adhere to rubber, which has an impact strength similar to phenol aldehyde resins and which imparts a hardness to rubber like glue.

8. A composition comprising essentially phenol rubber product and polymer of isobutylene having a molecular weight in the range 500 to 100,000, said phenol rubber product being a reaction product of rubber and at least one phenol, containing 1% to 5% of the phenol material chemically combined with the rubber which is resinous, thermoplastic, benzene soluble, acid resistant and alkali resistant, which does not adhere to rubber, which has an impact strength similar to phenol aldehyde resins and which imparts a hardness to rubber like glue.

9. A thin, flexible film comprising essentially beta-naphthol rubber product and polymer of isobutylene having a molecular weight in the range 500 to 100,000, said beta-naphthol rubber product being a reaction product of rubber and at least one phenol, containing 1% to 5% of the phenol material chemically combined with the rubber which is resinous, thermoplastic, benzene soluble, acid resistant and alkali resistant, which does not adhere to rubber, which has an impact strength similar to phenol aldehyde resins and which imparts a hardness to rubber like glue.

JAMES A. MITCHELL.

CERTIFICATE OF CORRECTION.

Patent No. 2,333,730.　　　　　　　　　　　　　　　November 9, 1943.

JAMES A. MITCHELL.

It is hereby certified that error appears in the printed specification of the above numbered patent requiring correction as follows: Page 2, first column, line 31, for "Patent No. 1,158,530" read --Patent No. 2,158,530--; line 39, after "approximately" strike out the parenthesis; and second column, line 55, for "or" read --of--; and that the said Letters Patent should be read with this correction therein that the same may conform to the record of the case in the Patent Office.

Signed and sealed this 11th day of January, A. D. 1944.

(Seal)　　　　　　　　　　　　　　　　　　　　　　Henry Van Arsdale,
　　　　　　　　　　　　　　　　　　　　　　　Acting Commissioner of Patents.